US00RE48893E

(19) United States
(12) Reissued Patent
Do et al.

(10) Patent Number: US RE48,893 E
(45) Date of Reissued Patent: Jan. 11, 2022

(54) APPARATUS AND CIRCUIT FOR PROCESSING CARRIER AGGREGATION

(71) Applicant: Samsung Electronics Co., Ltd., Suwon-si (KR)

(72) Inventors: Joo-Hyun Do, Seoul (KR); In-Hyoung Kim, Yongin-si (KR)

(73) Assignee: Samsung Electronics Co., Ltd., Suwon-si (KR)

(21) Appl. No.: 16/700,389

(22) Filed: Dec. 2, 2019

Related U.S. Patent Documents

Reissue of:
(64) Patent No.: 9,838,237
Issued: Dec. 5, 2017
Appl. No.: 14/922,798
Filed: Oct. 26, 2015

U.S. Applications:
(63) Continuation of application No. 14/152,297, filed on Jan. 10, 2014, now Pat. No. 9,197,477.

(30) Foreign Application Priority Data

Mar. 20, 2013 (KR) ..... 10-2013-0029965

(51) Int. Cl.
*H04L 27/26* (2006.01)
*H04L 5/00* (2006.01)
*H04L 27/00* (2006.01)

(52) U.S. Cl.
CPC ..... *H04L 27/2657* (2013.01); *H04L 5/001* (2013.01); *H04L 2027/0065* (2013.01)

(58) Field of Classification Search
CPC ..... H04L 27/2657; H04L 2027/0065; H04L 5/001
See application file for complete search history.

(56) References Cited

U.S. PATENT DOCUMENTS 7,680,236 B1 3/2010 Melanson et al.
7,848,397 B2 12/2010 Small
(Continued)

FOREIGN PATENT DOCUMENTS

KR 10-2006-0133108 A 12/2006
KR 10-2008-0052864 A 6/2008
(Continued)

OTHER PUBLICATIONS

Qualcomm Incorporated, Considerations for single-chip implementations of carrier aggregation, R4-130399, 3GPP TSG-RAN WG4 Meeting #66, Feb. 1, 2013, St. Julian's, Malta.
(Continued)

*Primary Examiner* — Mark Sager
(74) *Attorney, Agent, or Firm* — Jefferson IP Law, LLP

(57) ABSTRACT

A circuit for processing Carrier Aggregation (CA) is provided. The circuit includes a plurality of Component Carrier (CC) processors, each CC processor configured to estimate a frequency offset for a related CC and to compensate the estimated frequency offset, a reference clock generator configured to generate a reference clock using a reference frequency offset as one of frequency offsets output from the plurality of CC processors, a plurality of reception Phase Lock Loop (PLL) units, each reception PLL unit configured to generate a reception carrier frequency for the related CC corresponding to the reference clock, and a plurality of transmission PLL units, each transmission PLL unit configured to generate a transmission carrier frequency for the related CC corresponding to the reference clock.

33 Claims, 8 Drawing Sheets

(56) References Cited

U.S. PATENT DOCUMENTS

| | | | |
|---|---|---|---|
| 8,554,815 | B1 * | 10/2013 | Do et al. |
| 9,197,477 | B2 * | 11/2015 | Do ..... H04L 5/001 |
| 2002/0050946 | A1 | 5/2002 | Chang et al. |
| 2005/0233715 | A1 | 10/2005 | Laroia et al. |
| 2006/0067430 | A1 | 3/2006 | Wu et al. |
| 2008/0137768 | A1 | 6/2008 | Park et al. |
| 2009/0154613 | A1 | 6/2009 | Lai |
| 2009/0258628 | A1 | 10/2009 | Lindoff et al. |
| 2009/0316620 | A1 | 12/2009 | Simic et al. |
| 2010/0296389 | A1 | 11/2010 | Khandekar et al. |
| 2011/0222443 | A1 | 9/2011 | Khlat |
| 2012/0157101 | A1 | 6/2012 | Uemura et al. |
| 2012/0213096 | A1 | 8/2012 | Krishnamurthy et al. |
| 2012/0213190 | A1 | 8/2012 | Yoon et al. |
| 2013/0188756 | A1 | 7/2013 | Sundstrom et al. |
| 2013/0202069 | A1 | 8/2013 | Nilsson et al. |
| 2014/0171001 | A1 | 6/2014 | Fernando et al. |
| 2014/0191815 | A1 | 7/2014 | Mirzaei et al. |

FOREIGN PATENT DOCUMENTS

| | | | |
|---|---|---|---|
| KR | 10-2011-0031200 | A | 3/2011 |
| WO | 2012/008705 | A2 | 1/2012 |

OTHER PUBLICATIONS

Korean Decision on Grant dated Nov. 13, 2019, issued in Korean Patent Application No. 10-2013-0029965.

* cited by examiner

APPARATUS AND CIRCUIT FOR PROCESSING CARRIER AGGREGATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application is a continuation application of prior application Ser. No. 14/152,297, filed on Jan. 10, 2014, which claimed the benefit under 35 U.S.C. §119(a) of a Korean patent application filed on Mar. 20, 2013 in the Korean Intellectual Property Office and assigned Serial No. 10-2013-0029965, the entire disclosure of each of which is hereby incorporated by reference.

TECHNICAL FIELD

The present disclosure relates to an apparatus and circuit for processing Carrier Aggregation (CA) in a wireless communication system. More particularly, the present disclosure relates to an apparatus and circuit for processing CA using a Component Carrier (CC) in a wireless communication system.

BACKGROUND

In a Long Term Evolution-Advanced (LTE-A) mobile communication system of the related art, a CA scheme has been used. The CA scheme is a scheme in which a CC is added in order to increase a data rate without impacting use of a legacy User Equipment (UE), which uses a single carrier. The CA scheme has been applied in the Release 10 version in the LTE mobile communication system, and, for example, the maximum number of CCs used in the CA scheme is five.

However, there is not currently a design for a MOdulator/DE-Modulator (MODEM) that considers the CA scheme.

The CA scheme is divided into an intra-band CA scheme, in which CCs are in the same frequency band, and an inter-band CA scheme, in which the CCs are in different frequency bands according to carrier frequency allocation for each CC. The inter-band CA scheme may be specified into a contiguous CA scheme, in which CCs are in contiguous frequency bands, and a non-contiguous CA scheme, in which the CCs are in non-contiguous frequency bands according to frequency separation among CCs.

Based on frequency usage fairness, network providers are allocated a CC by 5~10 MHz in the same frequency band. Therefore, the CA scheme is generally implemented with a non-contiguous CA scheme or an inter-band CA scheme rather than an intra-band contiguous CA scheme.

In multi-carrier schemes of the related art, a receiver performs a frequency down conversion operation and a filtering operation based on a center frequency of more than two contiguous bandwidths which have a relatively narrow system bandwidth and performs a filtering operation per frequency bandwidth in an analog domain or a digital domain in order to receive more than two contiguous bandwidths which have the relatively narrow system bandwidth. For example, in the LTE mobile communication system, it should be assumed that a signal of each of contiguous bandwidths is received in the same Node B at the same timing.

However, a CA scheme which is currently considered in the LTE mobile communication system is operated based on signals which are transmitted at different timing points from two Node Bs which are at different locations and have different frequency offsets.

In CA schemes of the related art, multiple channels with contiguous CCs are processed such that it is impossible to properly compensate a frequency offset if a timing point of a signal is changed or a frequency offset is changed. This causes a decrease of transmission/reception performance. Thus, the CA schemes of the related art may not be used if a signal is transmitted/received through an inter-band or an intra-band non-contiguous bandwidth.

Accordingly, a need exists for an improved apparatus and method for processing CA.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and circuit for processing Carrier Aggregation (CA).

Another aspect of the present disclosure is to provide an apparatus and circuit for processing CA using a reference Component Carrier (CC).

Another aspect of the present disclosure is to provide apparatus and circuit for processing CA using one reference clock.

Another aspect of the present disclosure is to provide an apparatus and circuit for processing CA by considering a deployment scenario for various CCs.

In accordance with an aspect of the present disclosure, a circuit for processing CA is provided. The circuit includes a plurality of CC processors, each CC processor configured to estimate a frequency offset for a related CC and to compensate the estimated frequency offset, a reference clock generator configured to generate a reference clock using a reference frequency offset as one of frequency offsets output from the plurality of CC processors, a plurality of reception Phase Lock Loop (PLL) units, each reception PLL unit configured to generate a reception carrier frequency for the related CC corresponding to the reference clock, and a plurality of transmission PLL units, each transmission PLL unit configured to generate a transmission carrier frequency for the related CC corresponding to the reference clock.

In accordance with another aspect of the present disclosure, an apparatus for processing CA is provided. The apparatus includes a plurality of CC processors, each CC processor configured to estimate a frequency offset for a related CC and to compensate the estimated frequency offset, a reference clock generator configured to generate a reference clock using a reference frequency offset as one of frequency offsets output from the plurality of CC processors, a plurality of reception PLL units, each reception PLL unit configured to generate a reception carrier frequency for the related CC corresponding to the reference clock, and a plurality of transmission PLL units, each transmission PLL unit configured to generate a transmission carrier frequency for the related CC corresponding to the reference clock.

In accordance with another aspect of the present disclosure, a circuit for processing CA is provided. The circuit includes a plurality of CC processors, each CC processor configured to estimate a frequency offset for a related CC, a reference clock generator configured to generate a reference clock using a reference frequency offset as one of frequency offsets output from the plurality of CC processors, a plurality of reception PLL units, each reception PLL unit configured to generate a reception carrier frequency for the related CC corresponding to the reference clock and to compensate the estimated frequency offset, and a plurality of transmission PLL units, each transmission PLL unit configured to generate a transmission carrier frequency for the related CC corresponding to the reference clock and to compensate the estimated frequency offset.

In accordance with another aspect of the present disclosure, an apparatus for processing CA is provided. The apparatus includes a plurality of CC processors, each CC processor configured to estimate a frequency offset for a related CC, a reference clock generator configured to generate a reference clock using a reference frequency offset as one of frequency offsets output from the plurality of CC processors, a plurality of reception PLL units, each reception PLL unit configured to generate a reception carrier frequency for the related CC corresponding to the reference clock and to compensate the estimated frequency offset, and a plurality of transmission PLL units, each transmission PLL unit configured to generate a transmission carrier frequency for the related CC corresponding to the reference clock and to compensate the estimated frequency offset.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
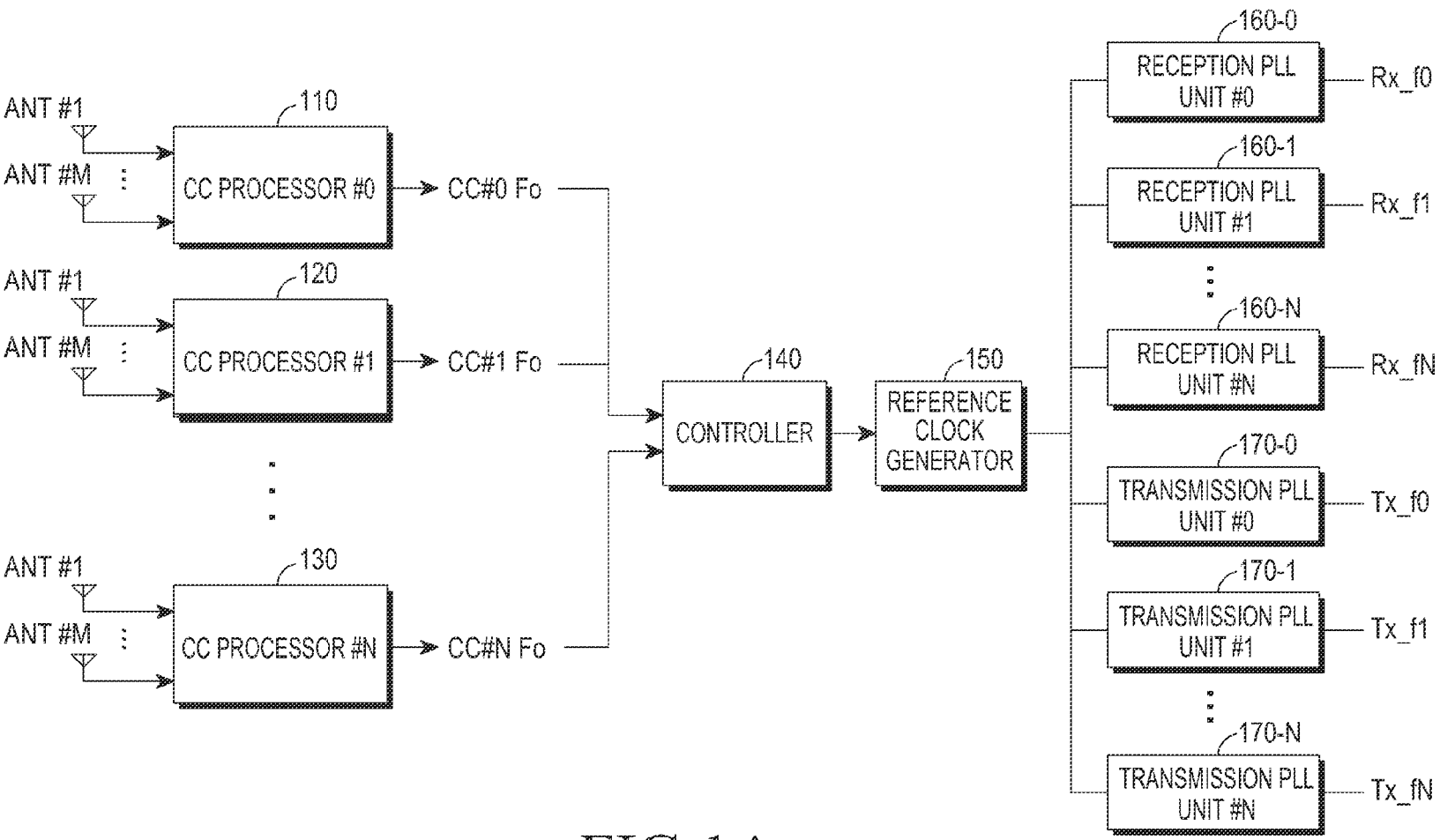
FIG. 1A schematically illustrates an internal structure of a Carrier Aggregation (CA) processing apparatus in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first", "second", and so forth will be used to describe various components, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing embodiments only and is not intended to be limiting of the embodiments. As used herein, the singular forms are intended to include the plural forms as well, unless the context clearly indicates otherwise. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings.

An embodiment of the present disclosure proposes an apparatus and circuit for processing Carrier Aggregation (CA).

An embodiment of the present disclosure proposes an apparatus and circuit for processing CA using a reference Component Carrier (CC).

An embodiment of the present disclosure proposes an apparatus and circuit for processing CA using one reference clock.

An embodiment of the present disclosure proposes an apparatus and circuit for processing CA by considering a deployment scenario for various CCs.

An apparatus and method proposed in an embodiment of the present disclosure may be applied to various mobile communication systems such as a Long Term Evolution (LTE) mobile communication system, a Long Term Evolution-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a 3rd Generation Project Partnership 2 (3GPP2), a Wideband Code Division Multiple Access (WCDMA) mobile communication system proposed in a 3GPP2, a Code Division Multiple Access (CDMA) mobile communication system proposed in a 3GPP2, an Institute of Electrical and Electronics Engineers (IEEE) mobile communication system, an Evolved Packet System (EPS), and the like.

Figure 1B:
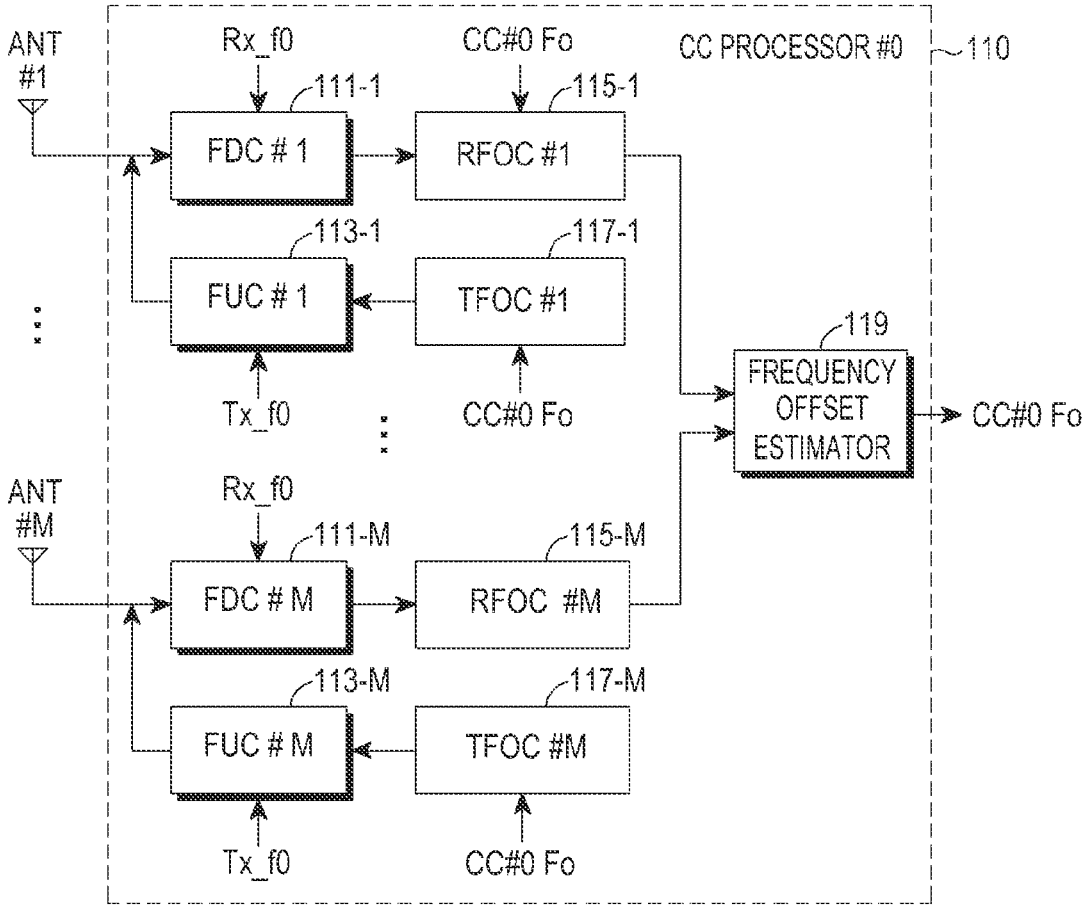
FIG. 1B schematically illustrates an internal structure of a Component Carrier (CC) processor, such as the CC processor #1 110 in FIG. 1A, according to an embodiment of the present disclosure.
Figure 1C:
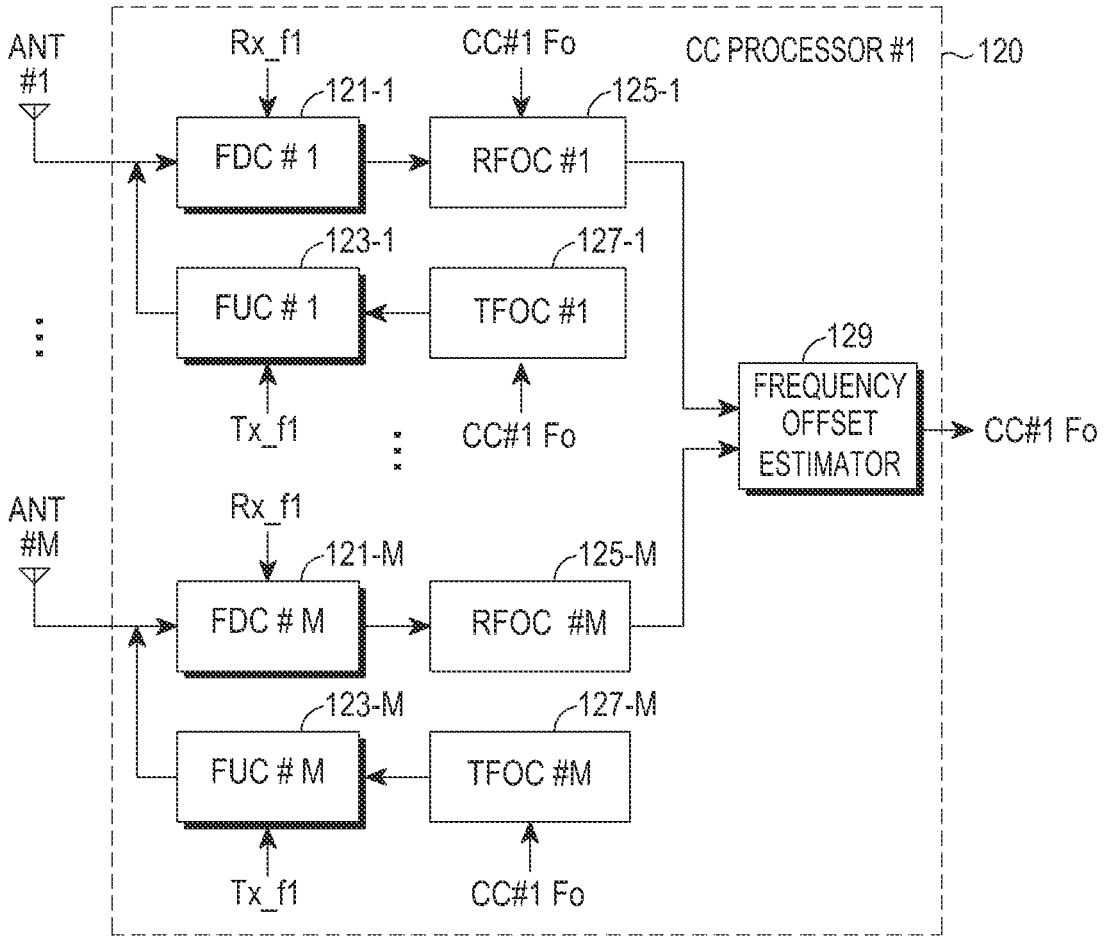
FIG. 1C schematically illustrates an internal structure of a CC processor, such as the CC processor #1 120 in FIG. 1A, according to an embodiment of the present disclosure.
Figure 1D:
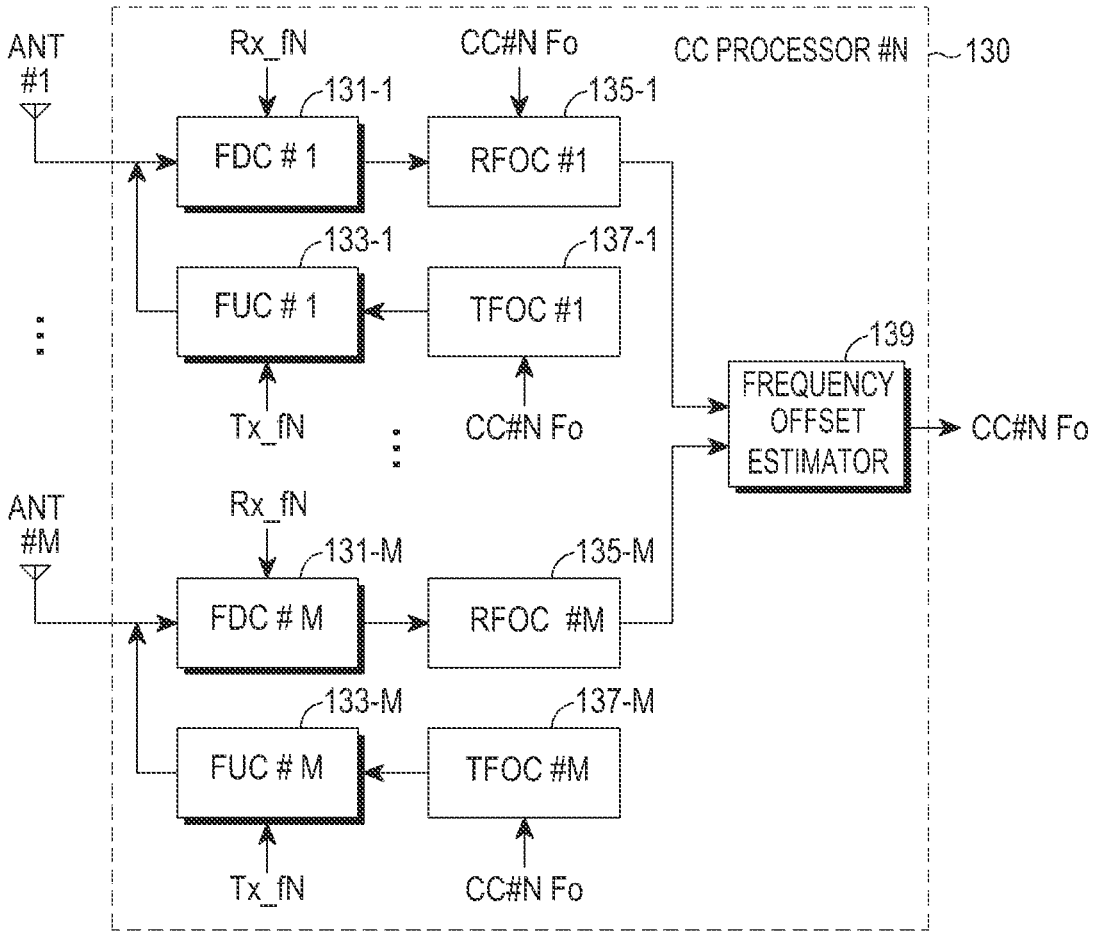
FIG. 1D schematically illustrates an internal structure of a CC processor, such as the CC processor # N 130 in FIG. 1A, according to an embodiment of the present disclosure.

FIG. 1A schematically illustrates an internal structure of a CA processing apparatus in a wireless communication system according to an embodiment of the present disclosure;

FIG. 1B schematically illustrates an internal structure of a CC processor, such as the CC processor #0 110 in FIG. 1A, according to an embodiment of the present disclosure;

FIG. 1C schematically illustrates an internal structure of a CC processor, such as the CC processor #1 120 in FIG. 1A, according to an embodiment of the present disclosure; and FIG. 1D schematically illustrates an internal structure of a CC processor, such as the CC processor # N 130 in FIG. 1A, according to an embodiment of the present disclosure.

Prior to a description of FIGS. 1A to 1D, it will be noted that an internal structure of a CA processing apparatus in FIGS. 1A to 1D is an internal structure of a CA processing apparatus based on a frequency compensator.

Referring to FIG. 1A, the CA processing apparatus includes a plurality of reception antennas, e.g., M reception antennas, i.e., a reception antenna ANT #1 to a reception antenna ANT #M, a plurality of CC processors, e.g., N+1 CC processors, i.e., a CC processor #0110, a CC processor #1 120, . . . , a CC processor # N 130, a controller 140, a reference clock generator 150, a plurality of reception Phase Lock Loop (PLL) units, e.g., N+1 reception PLL units, i.e., a reception PLL unit #0 160-0, a reception PLL unit #1 160-1, . . . , a reception PLL unit #N 160-N, and a plurality of transmission PLL units, e.g., N+1 transmission PLL units, i.e., a transmission PLL unit #0 170-0, a transmission PLL unit #1 170-1, . . . , a transmission PLL unit #N 170-N.

Referring to FIG. 1B, the CC processor #0 110 includes M Frequency Down-Converters (FDCs), i.e., an FDC #1 111-1, . . . , an FDC # M 111-M which are coupled to M reception antennas, i.e., a reception antenna ANT#1 to a reception antenna ANT#M, respectively, M Frequency Up-Converters (FUCs), i.e., an FUC #1 113-1, . . . , an FUC # M 113-M which are coupled to the reception antenna ANT#1 to the reception antenna ANT#M, respectively, M Reception Frequency Offset Compensators (RFOCs), i.e., an RFOC #1 115-1, . . . , an RFOC #M 115-M which are coupled to the M FDCs, respectively, M Transmission Frequency Offset Compensators (TFOCs), i.e., a TFOC #1 117-1, . . . , a TFOC #M 117-M which are coupled to the M FUCs, respectively, and a frequency offset estimator 119.

Referring to FIG. 1C, the CC processor #1 120 includes M FDCs, i.e., an FDC #1 121-1, . . . , an FDC # M 121-M which are coupled to the reception antenna ANT#1 to the reception antenna ANT#M, respectively, M FUCs, i.e., an FUC #1 123-1, . . . , an FUC # M 123-M which are coupled to the reception antenna ANT#1 to the reception antenna ANT#M, respectively, M RFOCs, i.e., an RFOC #1 125-1, . . . , an RFOC #M 125-M which are coupled to the M FDCs, respectively, M TFOCs, i.e., a TFOC #1 127-1, . . . , a TFOC #M 127-M which are coupled to the M FUCs, respectively, and a frequency offset estimator 129.

Referring to FIG. 1D, the CC processor # N 130, as the last CC processor, includes M FDCs, i.e., an FDC #1 131-1, . . . , an FDC # M 131-M which are coupled to the reception antenna ANT#1 to the reception antenna ANT#M, respectively, M FUCs, i.e., an FUC #1 133-1, . . . , an FUC # M 133-M which are coupled to the reception antenna ANT#1 to the reception antenna ANT#M, respectively, M RFOCs, i.e., an RFOC #1 135-1, . . . , an RFOC #M 135-M which are coupled to the M FDCs, respectively, M TFOCs, i.e., a TFOC #1 137-1, . . . , a TFOC #M 137-M which are coupled to the M FUCs, respectively, and a frequency offset estimator 139.

As illustrated in FIGS. 1A to 1D, the CA processing apparatus includes only one reference clock generator, i.e., the reference clock generator 150, and the reference clock generator 150 generates a reference clock. For example, the reference clock generator 150 may be implemented as a Temperature Compensated Crystal Oscillator (TCXO) or a Digitally Compensated Crystal Oscillator (DCXO). In FIGS. 1A to 1D, while the reference clock generator 150 is implemented as a TCXO or a DCXO, the reference clock generator 150 may be implemented with various forms.

Each of the reception PLL units, i.e., the reception PLL unit #0 160-0, the reception PLL unit #1 160-1, . . . , the reception PLL unit #N 160-N, is connected to the reference clock generator 150, and generates a Reception Carrier Frequency (RCF) for each CC using the reference clock which is generated in the reference clock generator 150. The reception PLL unit #0 160-0 generates an RCF for a CC #0, and the reception PLL unit #1 160-1 generates an RCF for a CC #1. In this way, the reception PLL unit #N 160-N, as the last reception PLL unit, generates an RCF for a CC #N.

Each of the transmission PLL units, i.e., the transmission PLL unit #0 170-0, the transmission PLL unit #1 170-1, . . . , the transmission PLL unit #N 170-N, is connected to the reference clock generator 150, and generates a Transmission Carrier Frequency (TCF) for each CC using the reference clock which is generated in the reference clock generator 150. The transmission PLL unit #0 170-0 generates a TCF for the CC #0, and the transmission PLL unit #1 170-1 generates a TCF for the CC #1. In this way, the transmission PLL unit #N 170-N, as the last transmission PLL unit, generates a TCF for the CC #N.

The CA processing apparatus includes one reference clock generator 150, and includes PLL units which may generate a TCF and an RCF for each CC based on the one reference clock generator 150 for each transmission path and each reception path.

If it is assumed that a Reference Reception Carrier Frequency Signal (RRCFS) for a CC#n (n=0, 1, 2, . . . , N) is "Rx_fn" and a Reference Transmission Carrier Frequency Signal for the CC#n is "Tx_fn", the Rx_fn is provided to an FDC for receiving a carrier frequency signal for each CC#n and the Tx_fn is provided to an FUC for transmitting the carrier frequency signal.

For example, an RRCFS for the CC #0 is "Rx_f0", an RTCFS for the CC #0 is "Tx_f0", the Rx_f0 is provided to the FDC #1 111-1 to the FDC #M 111-M for receiving a carrier frequency signal of the CC #0, and the Tx_f0 is provided to the FUC #1 113-1 to the FUC #M 113-M for transmitting the carrier frequency signal of the CC #0. Further, an RRCFS for the CC #1 is "Rx_f1", an RTCFS for the CC #1 is "Tx_f1", the Rx_f1 is provided to the FDC #1 121-1 to the FDC #M 121-M for receiving a carrier frequency signal of the CC #1, and the Tx_f1 is provided to the FUC #1 123-1 to the FUC #M 123-M for transmitting the carrier frequency signal of the CC #1. In this way, an RRCFS for the CC #N, as the last CC, is "Rx_fN", an RTCFS for the CC #N is "Tx_fN", the Rx_fN is provided to the FDC #1 131-1 to the FDC #M 131-M for receiving a carrier frequency signal of the CC #N, and the Tx_fN is provided to the FUC #1 133-1 to the FUC #M 133-M for transmitting the carrier frequency signal of the CC #N.

A frequency offset estimator included in each CC processor is connected to M RFOCs included in a related CC processor, and estimates a frequency offset CC#n_Fo as a difference between an RRCFS which is provided to each CC processor through the N+1 reception PLL units included in the CA processing apparatus, i.e., the reception PLL unit #0 160-0, the reception PLL unit #1 160-1, . . . , the reception PLL unit #N 160-N and a received carrier frequency signal.

The frequency offset estimator 119 included in the CC processor #0 110 is connected to the RFOC #1 115-1, . . . , the RFOC #M 115-M, and estimates a CC#0_Fo as a frequency offset which is a difference between an RRCFS Rx_f0 which is provided through the reception PLL unit #0 160-0, the reception PLL unit #1 160-1, . . . , the reception PLL unit # N 160-N, and the received carrier frequency signal.

The frequency offset estimator 129 included in the CC processor #1 120 is connected to the RFOC #1 125-1, . . . , the RFOC #M 125-M, and estimates a CC#1_Fo as a frequency offset which is a difference between an RRCFS Rx_f1 which is provided through the reception PLL unit #0 160-0, the reception PLL unit #1 160-1, . . . , the reception PLL unit # N 160-N, and the received carrier frequency signal.

In this way, the frequency offset estimator 129, as the last frequency offset estimator included in the CC processor #N 130, is connected to the RFOC #1 135-1, . . . , the RFOC #M 135-M, and estimates a CC#N_Fo as a frequency offset which is a difference between an RRCFS Rx_fN which is provided through the reception PLL unit #0 160-0, the reception PLL unit #1 160-1, . . . , the reception PLL unit # N 160-N, and the received carrier frequency signal.

Each CC processor compensates a transmission frequency offset and a reception frequency offset, a description of which will be provided below.

Firstly, an operation of compensating the reception frequency offset in each CC processor will be described.

An RFOC included in each CC processor compensates a reception frequency offset using the frequency offset CC#n_Fo output from a frequency offset estimator included in a related CC processor.

For example, in the CC processor #0 110, the RFOC #1 115-1 is connected to the FDC #1 111-1, and estimates the reception frequency offset using the CC#0_Fo as the frequency offset output from the frequency offset estimator 119. In this way, the RFOC #M 115-M, as the last RFOC, is connected to the FDC #M 111-M, and estimates the reception frequency offset using the CC#0_Fo.

In the CC processor #1 120, the RFOC #1 125-1 is connected to the FDC #1 121-1, and estimates the reception frequency offset using the CC#1_Fo as the frequency offset output from the frequency offset estimator 129. In this way, the RFOC #M 125-M, as the last RFOC, is connected to the FDC #M 121-M, and estimates the reception frequency offset using the CC#1_Fo.

In the CC processor # N 130, as the last CC processor, the RFOC #1 135-1 is connected to the FDC #1 131-1, and estimates the reception frequency offset using the CC#N_Fo as the frequency offset output from the frequency offset estimator 139. In this way, the RFOC #M 135-M, as the last RFOC, is connected to the FDC #M 131-M, and estimates the reception frequency offset using the CC#N_Fo.

Secondly, an operation of compensating the transmission frequency offset in each CC processor will be described.

A TFOC included in each CC processor compensates a transmission frequency offset using the frequency offset CC#n_Fo output from the frequency offset estimator included in a related CC processor.

For example, in the CC processor #0 110, the TFOC #1 117-1 is connected to the FUC #1 113-1, and estimates the transmission frequency offset using the CC#0_Fo as the frequency offset output from the frequency offset estimator 119. In this way, the TFOC #M 117-M, as the last TFOC, is connected to the FUC #M 113-M, and estimates the transmission frequency offset using the CC#0_Fo.

In the CC processor #1 120, the TFOC #1 127-1 is connected to the FUC #1 123-1, and estimates the transmission frequency offset using the CC#1_Fo as the frequency offset output from the frequency offset estimator 129. In this way, the TFOC #M 127-M, as the last TFOC, is connected to the FUC #M 123-M, and estimates the transmission frequency offset using the CC#1_Fo.

In the CC processor # N 130, as the last CC processor, the TFOC #1 137-1 is connected to the FUC #1 133-1, and estimates the transmission frequency offset using the CC#N_Fo as the frequency offset output from the frequency offset estimator 139. In this way, the TFOC #M 137-M, as the last TFOC, is connected to the FUC #M 133-M, and estimates the transmission frequency offset using the CC#N_Fo.

For example, each of the TFOCs and the RFOCs in each CC processor may be implemented as a phase rotator such as a COordinate Rotation DIgital Computer (CORDIC), or a Read Only Table (ROM) table, or a module which may convert a frequency of a signal such as a complex multiplier based-phase converter. In an embodiment of the present disclosure, the TFOCs and the RFOCs are implemented as phase rotators, ROM tables, or phase converters. However, it will be understood by those of ordinary skill in the art that the TFOCs and the RFOCs may be implemented with various forms.

An operation of a CA processing apparatus according to an embodiment of the present disclosure will be described with reference to FIGS. 1A to 1D.

A reference clock for the CA processing apparatus compensates a frequency offset based on a frequency offset which is estimated in a frequency offset estimator included in a related CC processor corresponding to a CC which is selected from among N+1 CCs, i.e., the CC#0 to the CC#N, i.e., a reference frequency offset. In this case, a frequency offset compensator included in a transmission path and a reception path is not operated for the selected CC.

The CA processing apparatus may perform a reference clock control operation based on a CC which has the best channel quality among the N+1 CCs, i.e., the CC#0 to the CC#N. Here, the channel quality may be determined using various metrics such as a Carrier-to-Interference and Noise Ratio (CINR), Reference Signal Received Power (RSRP), a Reference Signal Received Quality (RSRQ), a Reference Signal Strength Indicator (RSSI), a Channel Quality Indicator (CQI), and a BLock Error Rate (BLER) for a control channel or a data channel for each CC. In FIGS. 1A to 1D, the various metrics such as the CINR, the RSRP, the RSRQ, the RSSI, the CQI, and the BLER are used for selecting a CC used for the reference clock control operation. However, it will be understood by those of ordinary skill in the art that metrics used for selecting the CC used for the reference clock control operation are not limited.

The CA processing apparatus may perform a reference clock control operation based on a CC having the best channel quality among N+1 CCs, i.e., the CC#0 to the CC#N. For example, a period of selecting a CC used for the reference clock control operation may be a measurement period by which various metrics such as the CINR, the RSRP, the RSRQ, the RSSI, the CQI, and the BLER are measured. If the various metrics such as the CINR, the RSRP, the RSRQ, the RSSI, the CQI, and the BLER are filtered, the period of selecting the CC used for the reference clock control operation may be set to a multiple of the measurement period.

A frequency offset which is estimated in a frequency offset estimator included in CC processors corresponding to remaining CCs which are not used for controlling the reference clock is used for compensating a frequency offset through TFOCs and RFOCs included in a related CC processor.

Figure 2A:
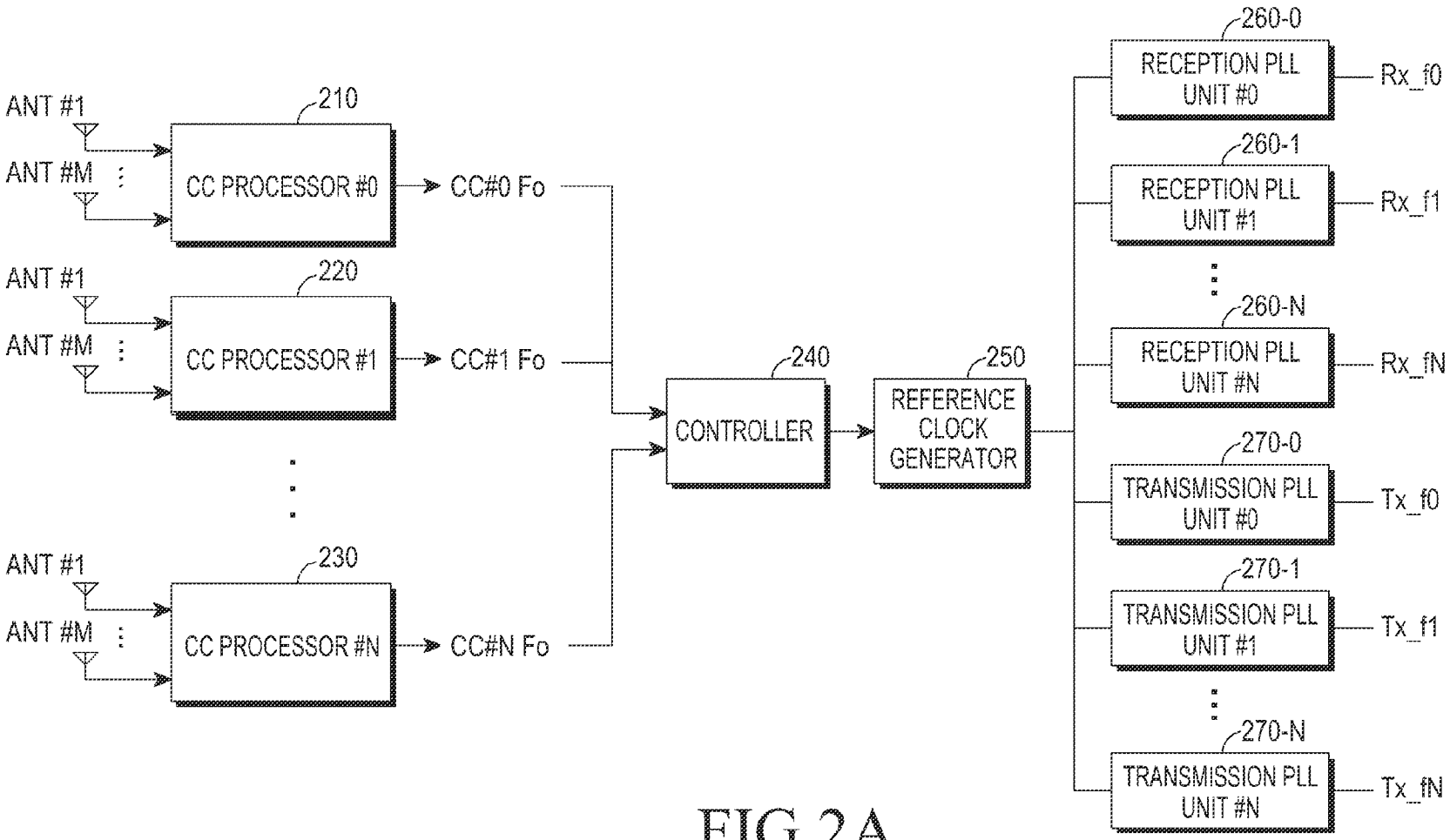
FIG. 2A schematically illustrates an internal structure of a CA processing apparatus in a wireless communication system according to an embodiment of the present disclosure.
Figure 2B:
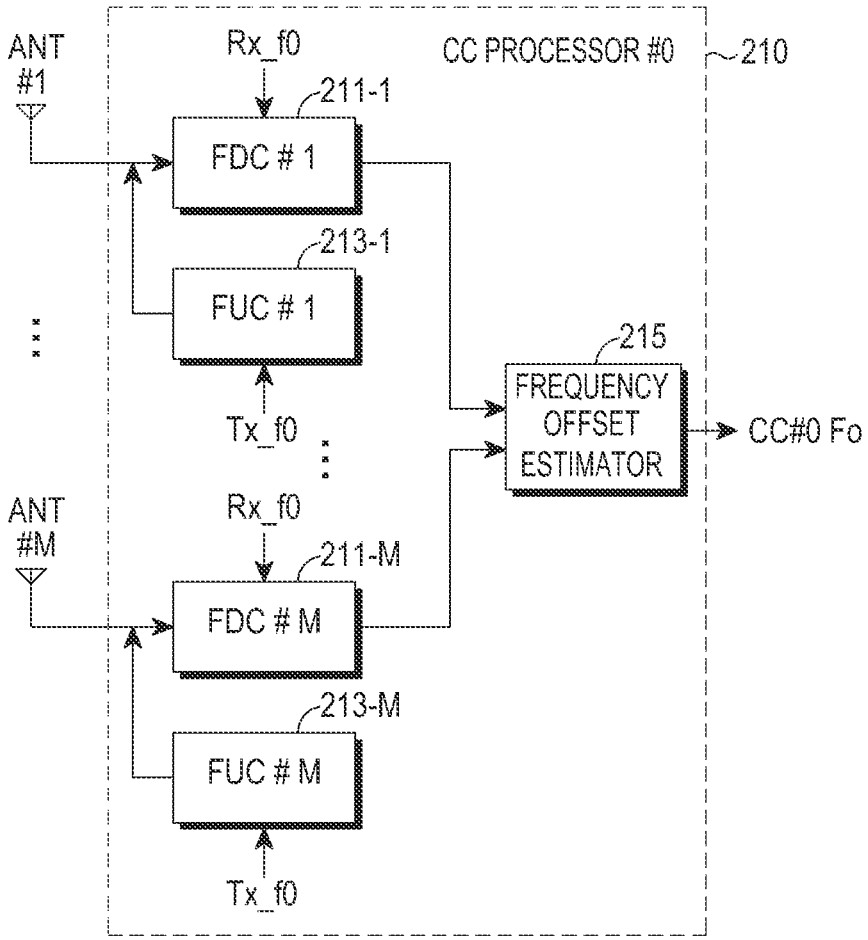
FIG. 2B schematically illustrates an internal structure of a CC processor, such as the CC processor #0 210 in FIG. 2A, according to an embodiment of the present disclosure.
Figure 2C:
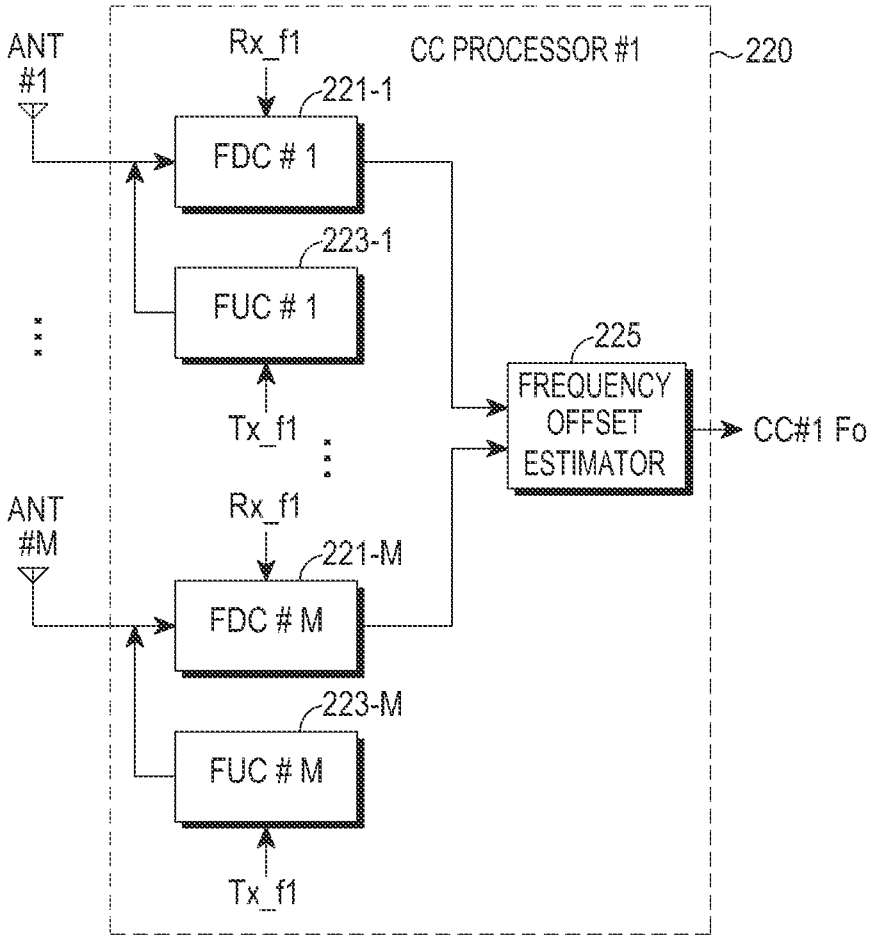
FIG. 2C schematically illustrates an internal structure of a CC processor, such as the CC processor #1 220 in FIG. 2A, according to an embodiment of the present disclosure.
Figure 2D:
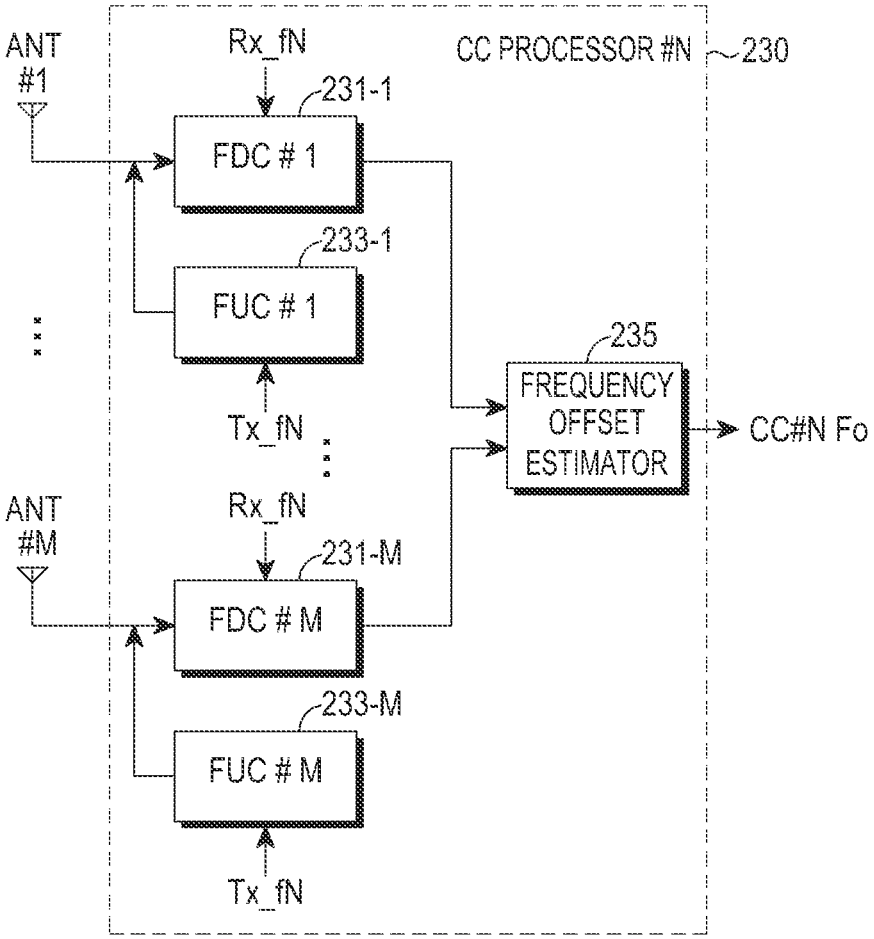
FIG. 2D schematically illustrates an internal structure of a CC processor, such as the CC processor # N 230 in FIG. 2A, according to an embodiment of the present disclosure.

FIG. 2A schematically illustrates an internal structure of a CA processing apparatus in a wireless communication system according to an embodiment of the present disclosure;

FIG. 2B schematically illustrates an internal structure of a CC processor, such as the CC processor #0 210 in FIG. 2A, according to an embodiment of the present disclosure;

FIG. 2C schematically illustrates an internal structure of a CC processor, such as the CC processor #1 220 in FIG. 2A, according to an embodiment of the present disclosure; and FIG. 2D schematically illustrates an internal structure of a CC processor, such as the CC processor # N 230 in FIG. 2A, according to an embodiment of the present disclosure.

Prior to a description of FIGS. 2A to 2D, it will be noted that an internal structure of a CA processing apparatus in FIGS. 2A to 2D is an internal structure of a CA processing apparatus based on PLL control.

Referring to FIG. 2A, the CA processing apparatus includes a plurality of reception antennas, e.g., M reception antennas, i.e., a reception antenna ANT #1 to a reception antenna ANT #M, a plurality of CC processors, e.g., N+1 CC processors, i.e., a CC processor #0 210, a CC processor #1 220, . . . , a CC processor # N 230, a controller 240, a reference clock generator 250, a plurality of reception PLL units, e.g., N+1 reception PLL units, i.e., a reception PLL unit #0 260-0, a reception PLL unit #1 260-1, . . . , a reception PLL unit #N 260-N, and a plurality of transmission PLL units, e.g., N+1 transmission PLL units, i.e., a transmission PLL unit #0 270-0, a transmission PLL unit #1 270-1, . . . , a transmission PLL unit #N 270-N.

Referring to FIG. 2B, the CC processor #0 210 includes M FDCs, i.e., an FDC #1 211-1, . . . , an FDC # M 211-M which are coupled to M reception antennas, i.e., a reception antenna ANT#1 to a reception antenna ANT#M, respectively, M FUCs, i.e., an FUC #1 213-1, . . . , an FUC # M 213-M which are coupled to the reception antenna ANT#1 to the reception antenna ANT#M, respectively, and a frequency offset estimator 215 which is connected to each of the M FDCs.

Referring to FIG. 2C, the CC processor #1 220 includes M FDCs, i.e., an FDC #1 221-1, . . . , an FDC# M 221-M which are coupled to the reception antenna ANT#1 to the reception antenna ANT#M, respectively, M FUCs, i.e., an FUC #1 223-1, . . . , an FUC # M 223-M which are coupled to the reception antenna ANT#1 to the reception antenna ANT#M, respectively, and a frequency offset estimator 225 which is connected to each of the M FDCs.

Referring to FIG. 2D, the CC processor # N 230, as the last CC processor, includes M FDCs, i.e., an FDC #1 231-1, . . . , an FDC # M 231-M which are coupled to the reception antenna ANT#1 to the reception antenna ANT#M, respectively, M FUCs, i.e., an FUC #1 233-1, . . . , an FUC # M 233-M which are coupled to the reception antenna ANT#1 to the reception antenna ANT#M, respectively, and a frequency offset estimator 235 which is connected to each of the M FDCs.

As illustrated in FIGS. 2A to 2D, the CA processing apparatus includes one reference clock generator, i.e., the reference clock generator 250, and the reference clock generator 250 generates a reference clock. For example, the reference clock generator 250 may be implemented as a TCXO or a DCXO. In FIGS. 2A to 2D, while the reference clock generator 250 is implemented as a TCXO or a DCXO, the reference clock generator 250 may be implemented with various forms.

Each of the reception PLL units, i.e., the reception PLL unit #0 260-0, the reception PLL unit #1 260-1, . . . , the reception PLL unit #N 260-N, is connected to the reference clock generator 250, and generates a reception carrier frequency for each CC using the reference clock which is generated in the reference clock generator 250. The reception PLL unit #0 260-0 generates a reception carrier frequency for a CC #0, and the reception PLL unit #1 260-1 generates a reception carrier frequency for a CC #1. In this way, the reception PLL unit #N 260-N, as the last reception PLL unit, generates a reception carrier frequency for a CC #N.

Each of the transmission PLL units, i.e., the transmission PLL unit #0 270-0, the transmission PLL unit #1 270-1, . . . , the transmission PLL unit #N 270-N, is connected to the reference clock generator 250, and generates a transmission carrier frequency for each CC using the reference clock which is generated in the reference clock generator 250. The transmission PLL unit #0 270-0 generates a transmission carrier frequency for the CC #0, and the transmission PLL unit #1 270-1 generates a transmission carrier frequency for the CC #1. In this way, the transmission PLL unit #N 270-N, as the last transmission PLL unit, generates a transmission carrier frequency for the CC #N.

The CA processing apparatus includes one reference clock generator 250, and includes PLL units which may generate a TCF and an RCF for each CC based on the one reference clock generator for each transmission path and each reception path.

If it is assumed that an RRCFS for a CC#n (n=0, 1, 2, . . . , N) is "Rx_fn" and an RTCFS for the CC#n is "Tx_fn", the Rx_fn is provided to an FDC for receiving a carrier frequency signal for each CC#n and the Tx_fn is provided to an FUC for transmitting the carrier frequency signal.

For example, an RRCFS for the CC #0 is "Rx_f0", an RTCFS for the CC #0 is "Tx_f0", the Rx_f0 is provided to the FDC #1 211-1 to the FDC #M 211-M for receiving a carrier frequency signal of the CC #0, and the Tx_f0 is provided to the FUC #1 213-1 to the FUC #M 213-M for transmitting the carrier frequency signal of the CC #0. Further, an RRCFS for the CC #1 is "Rx_f1", an RTCFS for the CC #1 is "Tx_f1", the Rx_f1 is provided to the FDC #1 221-1 to the FDC #M 221-M for receiving a carrier frequency signal of the CC #1, and the Tx_f1 is provided to the FUC #1 223-1 to the FUC #M 223-M for transmitting the carrier frequency signal of the CC #1. In this way, an RRCFS for the CC #N, as the last CC, is "Rx_fN", an RTCFS for the CC #N is "Tx_fN", the Rx_fN is provided to the FDC #1 231-1 to the FDC #M 231-M for receiving a carrier frequency signal of the CC #N, and the Tx_fN is provided to the FUC #1 233-1 to the FUC #M 233-M for transmitting the carrier frequency signal of the CC #N.

A frequency offset estimator included in each CC processor is connected to M RFOCs included in a related CC processor, and estimates a frequency offset CC#n_Fo as a difference between an RRCFS, which is provided to each CC processor through the N+1 reception PLL units included in the CA processing apparatus, i.e., the reception PLL unit #0 260-0, the reception PLL unit #1 260-1, . . . , the reception PLL unit #N 260-Nn and a received carrier frequency signal.

The frequency offset estimator 215 included in the CC processor #0 210 is connected to the FDC #1 211-1, . . . , the FDC #M 211-M, and estimates a CC#0_Fo as a frequency offset which is a difference between an RRCFS Rx_f0 which is provided through the reception PLL unit #0 260-0, the reception PLL unit #1 260-1, . . . , the reception PLL unit #N 260-N, and the received carrier frequency signal.

The frequency offset estimator 225 included in the CC processor #1 220 is connected to the FDC #1 221-1, . . . , the FDC #M 221-M, and estimates a CC#1_Fo as a frequency offset which is a difference between an RRCFS Rx_f1 which is provided through the reception PLL unit #0 260-0, the reception PLL unit #1 260-1, . . . , the reception PLL unit #N 260-N, and the received carrier frequency signal.

In this way, the frequency offset estimator 235, as the last frequency offset estimator included in the CC processor #N 230, is connected to the FDC #1 231-1, . . . , the FDC #M 231-M, and estimates a CC#N_Fo as a frequency offset which is a difference between an RRCFS Rx_fN which is provided through the reception PLL unit #0 260-0, the reception PLL unit #1 260-1, . . . , the reception PLL unit #N 260-N, and the received carrier frequency signal.

The CA processing apparatus in FIGS. 2A to 2D compensates a frequency offset estimated in each CC by controlling a reception PLL unit and a transmission PLL unit for a related CC, a description of which will be provided followed.

Firstly, a scheme in which the CA processing apparatus compensates the frequency offset estimated in each CC by controlling the reception PLL unit for the related CC will be described.

The frequency offset CC#0_Fo for the CC#0 is inputted to the reception PLL unit #0 260-0, thereby the reception PLL unit #0 260-0 compensates the estimated frequency offset CC#0_Fo.

The frequency offset CC#1_Fo for the CC#1 is inputted to the reception PLL unit #1 260-1, thereby the reception PLL unit #1 260-1 compensates the estimated frequency offset CC#1_Fo.

The frequency offset CC#N_Fo for the CC#N is inputted to the reception PLL unit #N 260-N, thereby the reception PLL unit #N 260-N compensates the estimated frequency offset CC#N_Fo.

Secondly, a scheme in which the CA processing apparatus compensates the frequency offset estimated in each CC by controlling the transmission PLL unit for the related CC will be described.

The frequency offset CC#0_Fo for the CC#0 is inputted to the transmission PLL unit #0 270-0, thereby the transmission PLL unit #0 270-0 compensates the estimated frequency offset CC#0_Fo.

The frequency offset CC#1_Fo for the CC#1 is inputted to the transmission PLL unit #1 270-1, thereby the transmission PLL unit #1 270-1 compensates the estimated frequency offset CC#1_Fo.

The frequency offset CC#N_Fo for the CC#N is inputted to the transmission PLL unit #N 270-N, thereby the transmission PLL unit #N 270-N compensates the estimated frequency offset CC#N_Fo.

An operation of a CA processing apparatus according to an embodiment of the present disclosure will be described with reference to FIGS. 2A to 2D.

A reference clock for the CA processing apparatus compensates a frequency offset based on a frequency offset which is estimated in a frequency offset estimator included in a related CC processor corresponding to a CC which is selected from among N+1 CCs, i.e., the CC#0 to the CC#N, i.e., a reference frequency offset.

The CA processing apparatus may perform a reference clock control operation based on a CC which has the best channel quality among the N+1 CCs, i.e., the CC#0 to the CC#N. Here, the channel quality may be determined using various metrics such as a CINR, an RSRP, an RSRQ, an RSSI, a CQI, and a BLER for a control channel or a data channel for each CC. In FIGS. 2A to 2D, the various metrics such as the CINR, the RSRP, the RSRQ, the RSSI, the CQI, and the BLER are used for selecting a CC used for the reference clock control operation. However, it will be understood by those of ordinary skill in the art that metrics used for selecting the CC used for the reference clock control operation are not limited.

The CA processing apparatus may perform a reference clock control operation based on a CC having the best channel quality among N+1 CCs, i.e., the CC#0 to the CC#N. For example, a period of selecting a CC used for the reference clock control operation may be a measurement period by which various metrics such as the CINR, the RSRP, the RSRQ, the RSSI, the CQI, and the BLER are measured. If the various metrics such as the CINR, the RSRP, the RSRQ, the RSSI, the CQI, and the BLER are filtered, the period of selecting the CC used for the reference clock control operation may be set to a multiple of the measurement period.

Meanwhile, a frequency offset which is estimated in a frequency offset estimator included in CC processors corresponding to remaining CCs which are not used for controlling the reference clock is used for controlling a related transmission/reception PLL unit and compensating a frequency offset.

The frequency offset which is estimated in the frequency offset estimator included in the CC processors corresponding to the remaining CCs which are not used for controlling the reference clock is used for compensating the frequency offset through TFOCs and RFOCs included in a related CC processor.

In FIGS. 2A to 2D, a CA processing apparatus compensates a frequency by compensating a frequency offset for a transmission PLL unit and a reception PLL unit in each CC without using a separated frequency offset compensator, so there is a need for providing a control signal from a MOdulator/DE-Modulator (MODEM) to a Radio Frequency Integrated Circuit (RFIC) by a frequency offset compensation period.

A CC processing circuit and/or a CC processing apparatus according to embodiments of the present disclosure as described in FIGS. 1A to 2D processes a CA with reference to a case in which the number of processors for receiving a signal is equal to the number of processors for transmitting a signal. However, it will be understood by those of ordinary skill in the art that the number of processors for receiving the signal may be equal to or different from the number of processors for transmitting the signal.

Further, it will be understood by those of ordinary skill in the art that the number of antennas and the number of CCs in a CC processing circuit and/or a CC processing apparatus according to embodiments of the present disclosure as described in FIGS. 1A to 2D are not limited.

As is apparent from the foregoing description, an embodiment of the present disclosure enables processing CA using a reference CC.

An embodiment of the present disclosure enables processing CA using one reference clock.

An embodiment of the present disclosure enables processing CA by considering a deployment scenario for various CCs.

An embodiment of the present disclosure enables processing CA without using a reference clock for each CC thereby minimizing a cost and a size.

An embodiment of the present disclosure enables compensation of a frequency offset per CC thereby providing various deployment scenarios and flexibly processing CA. So, in an apparatus which uses a relatively low-priced reference clock such as a Home evolved Node B (HeNB) and a repeater, flexible and stable CA implement is possible.

An embodiment of the present disclosure enables controlling generation of a reference clock based on a CC which has the best channel quality among CCs thereby stably controlling a clock.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for supporting carrier aggregation, the apparatus comprising:

a plurality of component carrier (CC) circuits, each of the plurality of CC circuits configured to estimate a frequency offset for a related CC;

a reference clock generator configured to generate a reference clock using at least one frequency offset of frequency offsets estimated by corresponding two or more of the plurality of CC circuits; and a plurality of phase lock loop (PLL) circuits, each of the plurality of PLL circuits configured to generate a reception carrier frequency or a transmission carrier frequency for at least one related CC corresponding to the at least one frequency offset used in the generating of the reference clock.

2. The apparatus of claim 1, wherein the plurality of PLL circuits comprises a set of reception PLL circuits configured to generate the reception carrier frequency, and a set of transmission PLL circuits configured to generate the transmission carrier frequency.

3. The apparatus of claim 1, further comprising:

a controller configured to select the at least one frequency offset from the frequency offsets as at least part of a reference frequency offset.

4. The apparatus of claim 1, further comprising:

a controller configured to compensate the estimated frequency offset using at least one of the plurality of CC circuits.

5. The apparatus of claim 4, wherein the controller is further configured to:

refrain from compensating the estimated frequency offset based at least in part on a determination that the at least one frequency offset is selected as at least part of a reference frequency offset.

6. The apparatus of claim 1, wherein the plurality of PLL circuits are further configured to:

compensate the estimated frequency offset corresponding to the at least one related CC.

7. The apparatus of claim 1, further comprising:

a controller configured to select the at least one frequency offset based at least in part on channel quality information corresponding to at least one of the plurality of CC circuits.

8. The apparatus of claim 7, wherein the channel quality information comprises a carrier-to-interference and noise ratio, reference signal received power, reference signal received quality, a reference signal strength indicator, a channel quality indicator, a block error rate, or any combination thereof.

9. The apparatus of claim 1, wherein the reference clock generator comprises a temperature compensated crystal oscillator, a voltage controlled-TCXO, or a digitally compensated crystal oscillator.

10. The apparatus of claim 1, wherein each of the plurality of CC circuits comprises:

a plurality of frequency down converters, each of the frequency down converters configured to down-convert a reference reception carrier frequency received from a first corresponding PLL circuit of the plurality of PLL circuits, the first corresponding PLL circuit including a reception PLL circuit;

a plurality of frequency up converters, each of the frequency up converters configured to up-convert a reference transmission carrier frequency received from a second corresponding PLL circuit of the plurality of PLL circuits, the second corresponding PLL circuit including a transmission PLL circuit;

a frequency offset estimator configured to estimate the at least one frequency offset using a difference between the reference reception carrier frequency and the reception carrier frequency;

a reception frequency offset compensator (RFOC) configured to compensate a reception frequency offset converted by corresponding one of the plurality of frequency down converters using the estimated frequency offset; and a transmission frequency offset compensator (TFOC) configured to compensate a transmission frequency offset converted by corresponding one of the plurality of frequency up converters using the estimated frequency offset.

11. The apparatus of claim 10, wherein the RFOC or the TFOC comprises a phase rotator, a read-only memory table, a complex multiplier based-phase converter, or any combination thereof.

12. The apparatus of claim 11, wherein the phase rotator comprises a coordinate rotation digital computer.

13. An apparatus for supporting carrier aggregation, the apparatus comprising:

a first component carrier (CC) circuit configured to estimate a first frequency offset for a first CC to be processed by the first CC circuit;

a second CC circuit configured to estimate a second frequency offset for a second CC to be processed by the second CC circuit;

a reference clock generator configured to generate a reference clock using the first frequency offset or the second frequency offset; and a phase lock loop (PLL) circuit configured to generate a reception carrier frequency or a transmission carrier frequency for the first CC or the second CC.

14. The apparatus of claim 13, wherein the PLL circuit comprises a set of one or more reception PLL circuits configured to generate the reception carrier frequency, and a set of one or more transmission PLL circuits configured to generate the transmission carrier frequency.

15. The apparatus of claim 13, further comprising:

a controller configured to select the first frequency offset or the second frequency offset as at least part of a reference frequency offset.

16. The apparatus of claim 13, further comprising:

a controller configured to compensate the estimated first frequency offset or the estimated second frequency offset using a corresponding one of the first CC circuit and the second CC circuit.

17. The apparatus of claim 13, wherein the PLL circuit is further configured to:

compensate the estimated first frequency offset or the estimated second frequency offset related to a corresponding one of the first CC and the second CC.

18. The apparatus of claim 13, further comprising:

a controller configured to select the first frequency offset or the second frequency offset based at least in part on channel quality information corresponding to at least one of the first CC circuit and the second CC circuit.

19. An apparatus for supporting carrier aggregation, the apparatus comprising:

a first component carrier (CC) circuit configured to:

estimate a first frequency offset for a first CC to be processed by the first CC circuit, and compensate the estimated first frequency offset;

a second CC circuit configured to:

estimate a second frequency offset for a second CC to be processed by the second CC circuit, and compensate the estimated second frequency offset;

a reference clock generator configured to generate a reference clock using the first frequency offset or the second frequency offset; and a phase lock loop (PLL) circuit configured to generate a reception carrier frequency or a transmission carrier frequency for the first CC or the second CC.

20. The apparatus of claim 19, wherein the PLL circuit comprises a set of one or more reception PLL circuits configured to generate the reception carrier frequency, and a set of one or more transmission PLL circuits configured to generate the transmission carrier frequency.

*21. An apparatus for performing carrier aggregation, the apparatus comprising:*

*a plurality of phase lock loop (PLL) circuits configured to:*

*respectively generate a plurality of first carrier frequencies that respectively correspond to a plurality of component carriers (CCs) based on a reference clock, and*

*receive a plurality of second carrier frequencies that respectively correspond to the plurality of CCs; and*

*a reference clock generator configured to generate a reference clock based on comparing at least one of the plurality of first carrier frequencies and corresponding at least one of the plurality of second carrier frequencies.*

*22. The apparatus of claim 21, wherein the apparatus is a home evolved node B (HeNB), or a repeater.*

*23. The apparatus of claim 21, wherein the plurality of PLL circuits comprises:*

*a set of reception PLL circuits configured to generate the plurality of first carrier frequencies; and*

*a set of transmission PLL circuits configured to generate a plurality of third carrier frequencies for transmitting signals, the third carrier frequencies respectively corresponding to the plurality of CCs.*

*24. A method for performing carrier aggregation, the method comprising:*

*generating a plurality of first carrier frequencies respectively corresponding to a plurality of component carriers (CCs) based on a reference clock;*

*receiving a plurality of second carrier frequencies respectively corresponding to the plurality of CCs;*

*comparing at least one of the plurality of first carrier frequencies with corresponding at least one of the plurality of second carrier frequencies; and*

*generating a reference clock based on the comparing.*

*25. The method of claim 24, further comprising:*

*compensating for at least one frequency difference that results from the comparison and respectively corresponds to at least one of the plurality of CCs.*

*26. The method of claim 25, further comprising:*

*identifying a reference frequency difference among the at least one frequency difference.*

*27. The method of claim 26, wherein the reference frequency difference is identified based on information for channel quality corresponding to each of the plurality of CCs.*

*28. The method of claim 27, wherein each information for channel quality comprises at least one of a carrier-to-interference and noise ratio, reference signal received power, reference signal received quality, a reference signal strength indicator, a channel quality indicator, or a block error rate.*

*29. An apparatus for performing carrier aggregation, the apparatus comprising:*

*a plurality of antennas; and*

*at least one processor configured to:*

*generate a plurality of first carrier frequencies respectively corresponding to a plurality of component carriers (CCs) based on a reference clock,*

*receive, via the plurality of antennas, a plurality of second carrier frequencies respectively corresponding to the plurality of CCs,*

*perform a comparison of at least one of the plurality of first carrier frequencies with corresponding at least one of the plurality of second carrier frequencies, and*

*generate a reference clock based on the comparison.*

*30. The apparatus of claim 29, wherein the at least one processor is further configured to compensate for at least*

*one frequency difference that results from the comparison and respectively corresponds to the plurality of CCs.*

*31. The apparatus of claim 29, wherein the at least one processor is further configured to identify a reference frequency difference among the at least one frequency difference.*

*32. The apparatus of claim 29, wherein the apparatus is a home evolved node B (HeNB), or a repeater.*

*33. The apparatus of claim 29, wherein the at least one processor comprises:*

*a plurality of frequency down converters, each of the frequency down converters configured to down-convert the generated first carrier frequencies;*

*a frequency offset estimator configured to perform the comparison between the generated first carrier frequencies and the received second carrier frequencies; and*

*a frequency offset compensator configured to compensate for at least one frequency difference that results from the comparison and respectively corresponds to at least one of the plurality of CCs.*

* * * * *